(12) United States Patent
Scown

(10) Patent No.: US 7,128,295 B2
(45) Date of Patent: Oct. 31, 2006

(54) PIVOT MECHANISM FOR QUICK INSTALLATION OF STOWAGE BINS OR ROTATING ITEMS

(75) Inventor: Stephen L. Scown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/905,502

(22) Filed: Jan. 7, 2005

(65) Prior Publication Data
US 2006/0151668 A1    Jul. 13, 2006

(51) Int. Cl.
*B64D 11/00* (2006.01)
(52) U.S. Cl. .................. 244/118.1; 244/118.5; 16/266
(58) Field of Classification Search .......... 244/118.1, 244/118.5, 129.1; 16/260, 265, 266; 312/120, 312/123, 248, 249.7
See application file for complete search history.

(56) References Cited

U.S. PATENT DOCUMENTS

| | | | |
|---|---|---|---|
| 620,551 A | 2/1899 | Porter | |
| 750,376 A | 1/1904 | Lampitt | |
| 2,445,399 A * | 7/1948 | Johnson | 244/87 |
| 3,656,801 A | 4/1972 | Doutt et al. | |
| 5,988,724 A * | 11/1999 | Wolda | 296/57.1 |
| 6,318,671 B1 * | 11/2001 | Schumacher et al. | 244/118.5 |
| 6,527,325 B1 * | 3/2003 | Steingrebe et al. | 296/37.7 |
| 6,796,592 B1 * | 9/2004 | Austin | 296/57.1 |

OTHER PUBLICATIONS

Simmons, G. and Worden, I., "Overhead Storage Bins", printed from Internet website: http://www.boeing.com/commercial/aeromagazine/aero_15/overhead_..., Nov. 23, 2004.

* cited by examiner

*Primary Examiner*—Galen Barefoot
(74) *Attorney, Agent, or Firm*—Harness Dickey & Pierce P.L.C.

(57) ABSTRACT

A pivot assembly is provided including a first pivot boss having an engagement extension and a first race element having a central race socket. A central engagement bushing is rotatably secured within the central race socket and includes an engagement chamber adapted to removably engage the engagement extension. The central engagement bushing allows the first race element to rotate relative to the first pivot boss while remaining longitudinally engaged to the first fixed pivot boss.

22 Claims, 5 Drawing Sheets

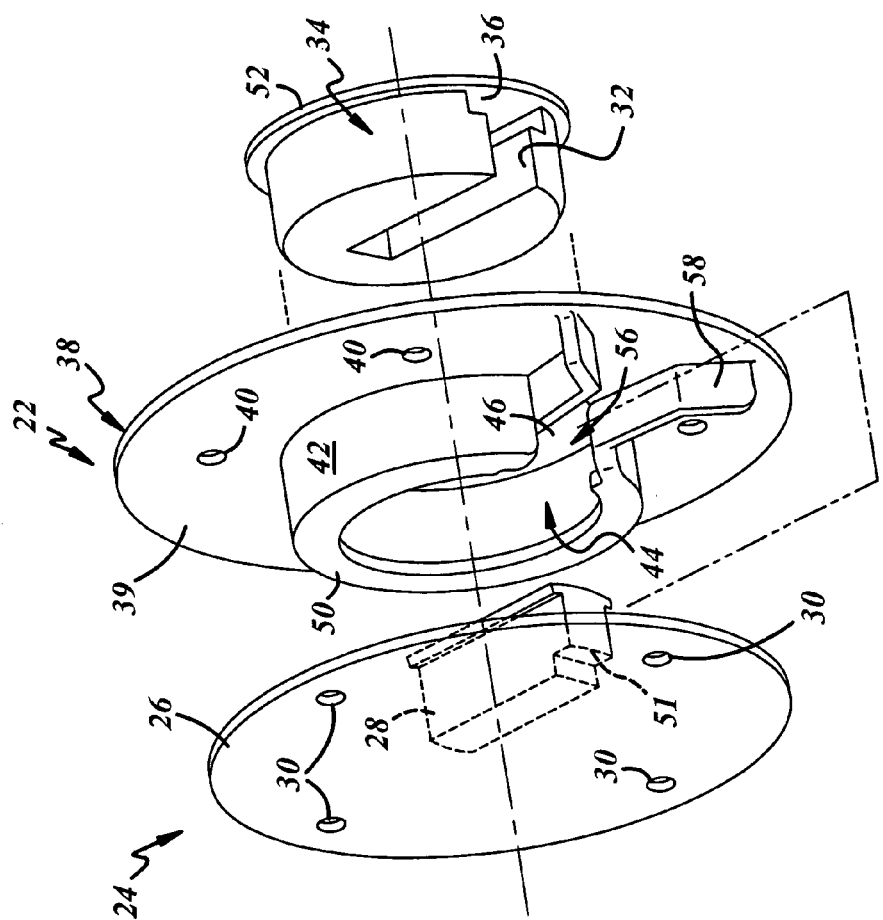
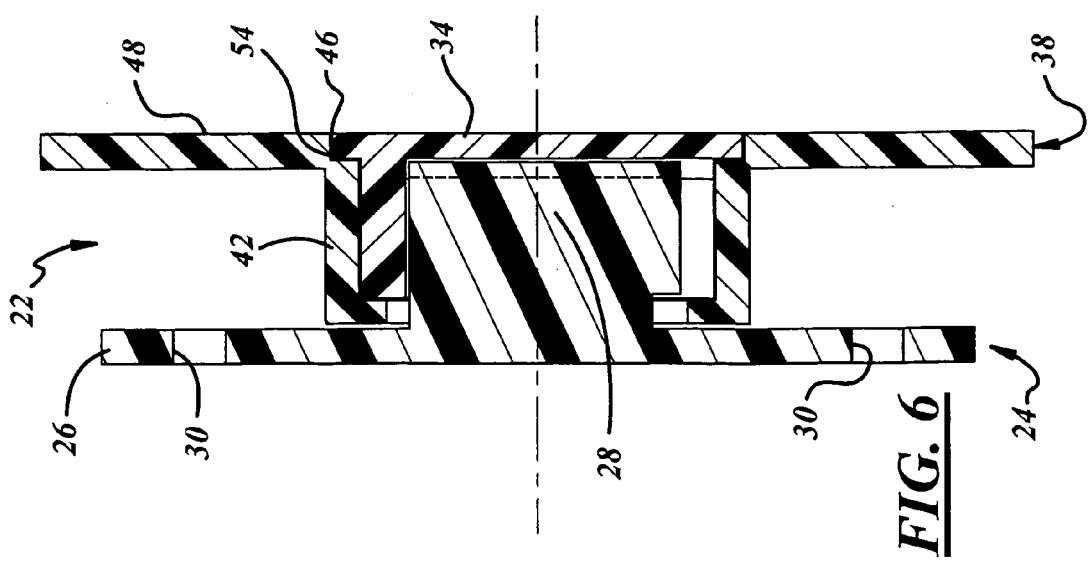

PIVOT MECHANISM FOR QUICK INSTALLATION OF STOWAGE BINS OR ROTATING ITEMS

TECHNICAL FIELD

The present invention relates generally to a pivot mechanism and more particularly to a pivot mechanism allowing for the quick installation of aircraft stowage bins or similar rotating items.

BACKGROUND

Industrial design considerations must consider a wide range of manufacturing and assembly concerns. Not the least of which involves the final assembly of individual components into a final product assembly. Complex designs may, in turn, result in complex assembly procedures. Complex procedures may lead to undesirably high cost increases due to labor costs. Complex assembly procedures may also decrease the precision of part assembly with a resultant decrease in fit-and-finish.

Thus, the nature of industrial design is often that it favors simplicity over complex assemblies. Such is the case in aircraft interiors. Aircraft interiors must withstand considerable use and abuse from consumers throughout the lifespan of the aircraft. Active functioning items must remain functioning in a safe and reliable fashion and must be easily removed and replaced when such functioning is impaired. All this should be accomplished with a requisite minimum of time and effort to fully realize cost savings.

In particular, one region of an aircraft interior known to pose challenges to such desired efficiencies are the overhead storage bins. This bins are heavily used and often abused during flights. Often passengers considerably overload them. This abuse in combination with their position within the aircraft often leads to complex fastener assemblies requiring tools to facilitate installation or removal. An installation assembly with reduced complexity and one that alleviated the need for tooling would simplify assembly, reduce assembly costs, allow for simplified replacement of damaged storage bins, and would reduce assembly timelines.

It would therefore be highly desirable to have a pivot mechanism that allowed for the quick installation of aircraft storage bins. It would also be highly desirable for such a pivot mechanism to allow for simplified bin removal for repair or replacement.

SUMMARY

A pivot assembly with quick installation characteristics is provided. Further, an aircraft bin assembly that can be even more inexpensively and more efficiently installed and removed without complex tooling procedures is provided.

A pivot assembly is provided including a first pivot boss having an engagement extension and a first race element having a central race socket. A central engagement bushing is rotatably secured within the central race socket and includes an engagement chamber adapted to removably engage the engagement extension. The central engagement bushing allows the first race element to rotate relative to the first pivot boss while remaining longitudinally engaged to the first fixed pivot boss.

Other features of the present disclosure will become apparent when viewed in light of the detailed description and preferred embodiment when taken in conjunction with the attached drawings and claims.

BRIEF DESCRIPTION OF THE DRAWINGS

FIG. 6 is a cross-sectional illustration of the pivot assembly illustrated in FIG. 5.

FIG. 7 is an exploded view illustration of the pivot assembly illustrated in FIGS. 5 and 6.

DETAILED DESCRIPTION

Figure 1:
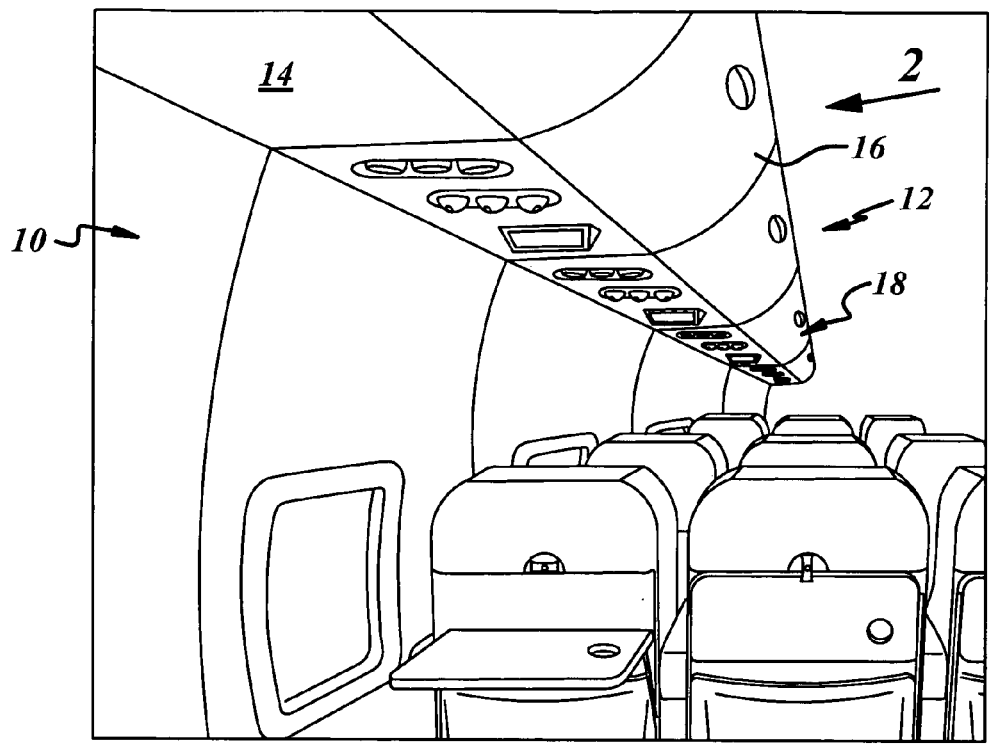
FIG. 1 is an illustration of an aircraft interior illustrating an aircraft bin assembly in accordance with the present invention.
Figure 5:
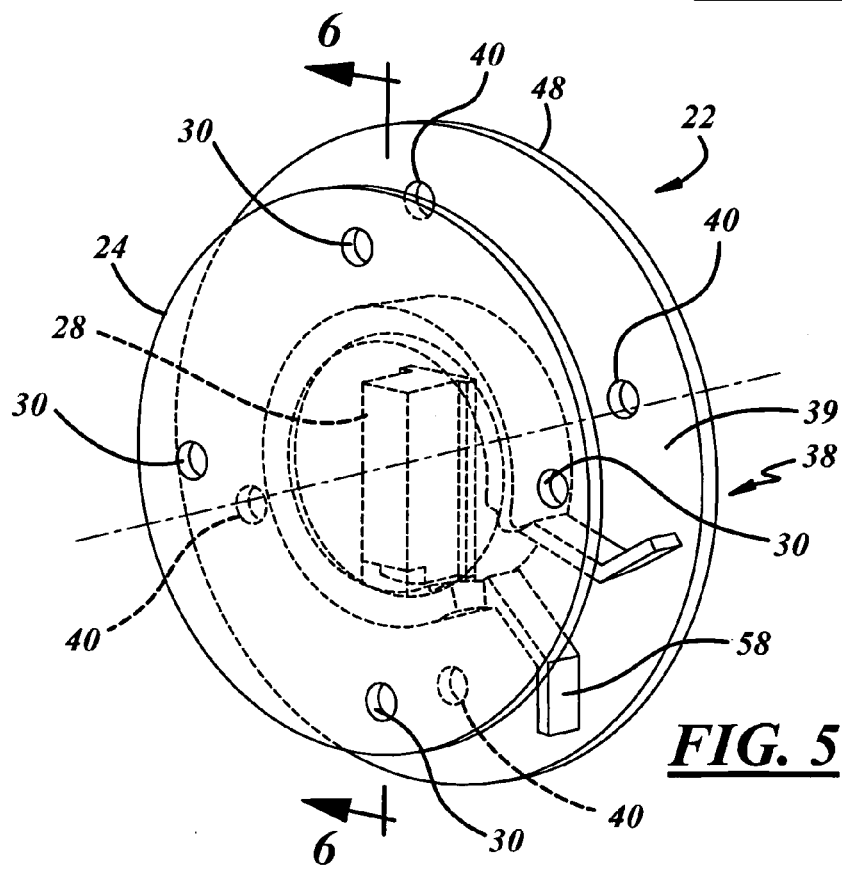
FIG. 5 is a detail illustration of the pivot assembly for use in the aircraft bin assembly illustrated in FIGS. 1–5.
Figure 2:
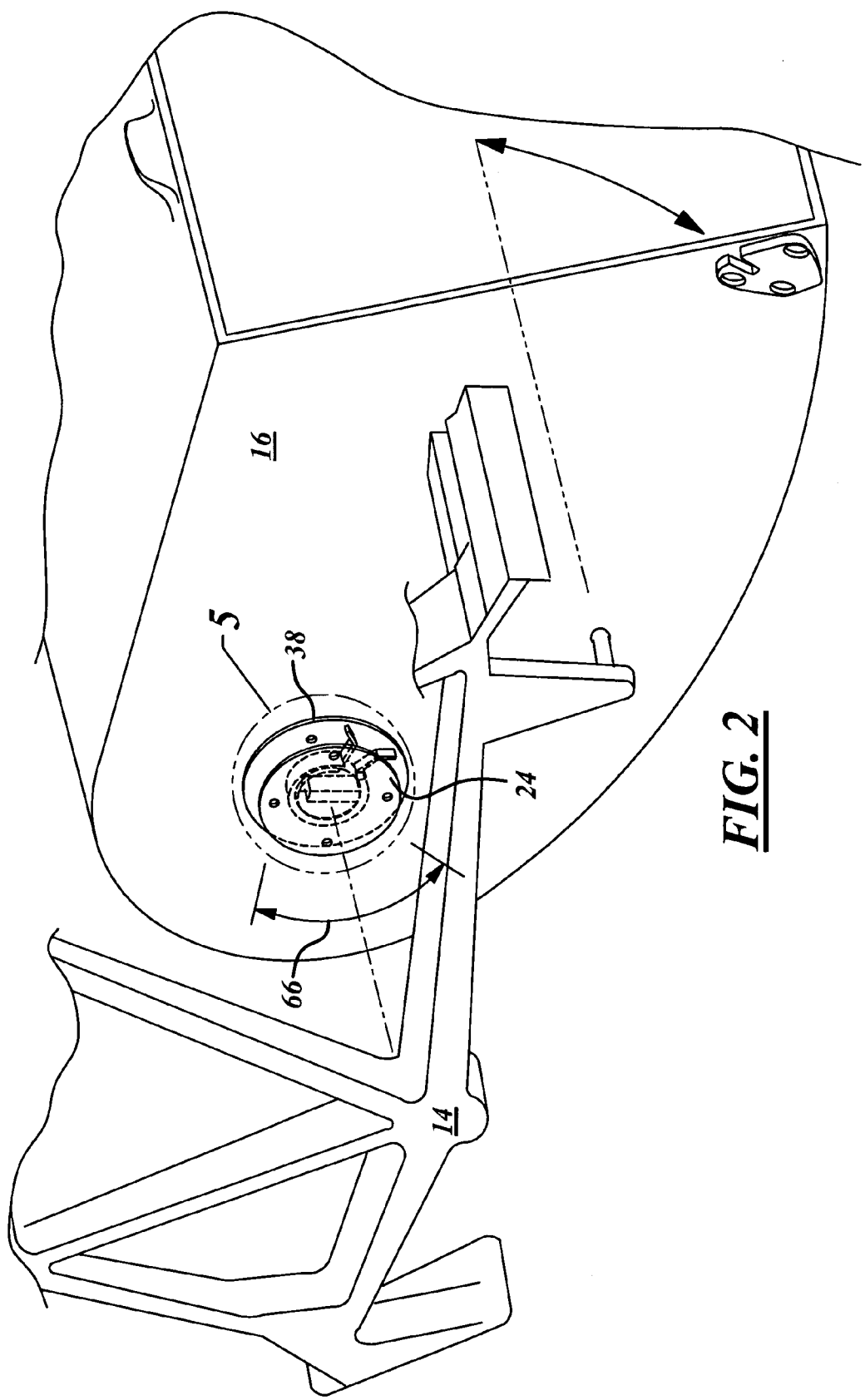
FIG. 2 is a detailed illustration of an aircraft bin assembly as illustrated in FIG. 1, the aircraft bin assembly illustrated in the range of operating positions.
Figure 3:
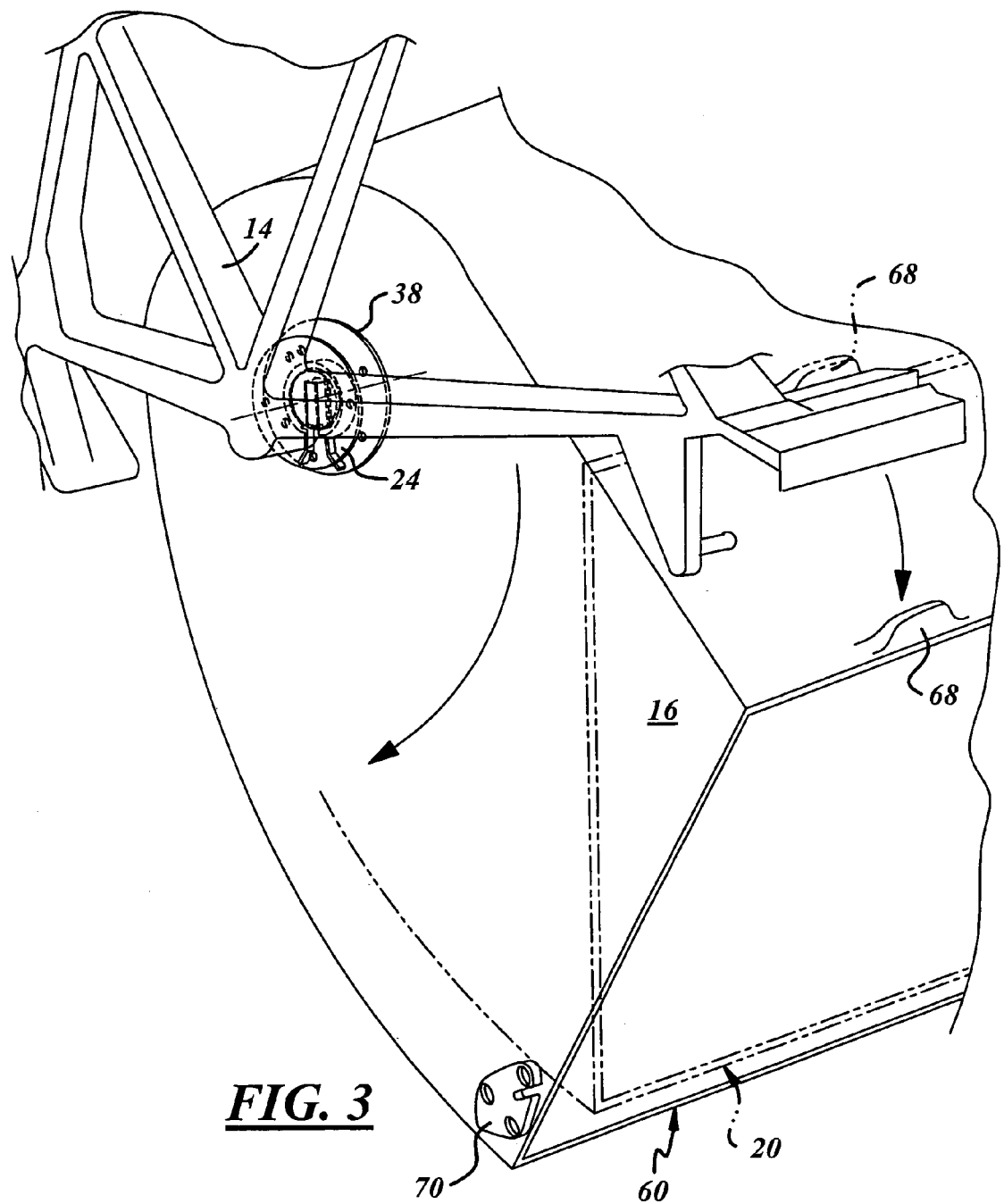
FIG. 3 is an illustration of the aircraft bin assembly as illustrated in FIG. 1, the aircraft bin assembly illustrated in both the installation position and the bin open position.

Referring now to FIG. 1 which is an illustration of an aircraft interior 10 in accordance with one embodiment of the present disclosure. The aircraft interior 10 includes an aircraft bin assembly 12 wherein passengers may store carry-on baggage and airline crew may store blankets and other sundries. The aircraft bin assembly 12 is comprised of an airline interior overhead structure 14 and a plurality of overhead bin elements 16. The overhead bin elements 16 are rotatably mounted to the aircraft interior overhead structure 14 such that they can be rotated between a bin closed position 18 and a bin open position 20 (see FIG. 3).

The present disclosure provides not only a unique and novel approach to such rotatable mounting, but provides improvements to installation and removal of an overhead bin element 16 from the aircraft interior overhead structure 14. This is accomplished through the use of a unique pivot assembly 22 as shown in FIGS. 2–7. A pair of such pivot assemblies 22 may be utilized on each bin element 16 and overhead structure 14 interface. Alternately, a single pivot assembly 22 may be used in combination with an alternate rotational mount to reduce complexity.

Each pivot assembly 22 is comprised of a first pivot boss 24 having a fixed boss mounting base 26. An engagement extension 28 protrudes from the fixed boss mounting base 26 or from the interior overhead structure 14. The fixed pivot boss 24 may, in fact, be simply formed as a portion of the interior overhead structure 14. The fixed boss mounting base 26 includes a plurality of boss mounting bores 30 by which the first pivot boss 24 may be fixedly mounted to the aircraft interior overhead structure 14 or alternately the overhead bin element 16. Although the engagement extension 28 may be formed in a variety of shapes, it is contemplated that it is shaped to fixedly engage an engagement chamber 32 formed within a central engagement bushing 34 such that upon insertion into the engagement chamber 32, the engagement extension 28 is restrained from axial separation. One particular embodiment illustrated contemplates a t-shaped cross-sectional engagement extension 28 matched with a t-shaped cross-sectional gap 36.

The central engagement bushing 34 is rotatably engaged to a first race element 38. The first race element 38 includes a fixed race mounting base 40 suitable for fixed mounting to the overhead bin element 16 or alternately the overhead structure 14 by way of a plurality of race mounting bores 39.

The first race element 38 includes a circular wall 42 extending from the fixed race mounting base 39 and forming a central race socket 44. The central engagement bushing 34 is rotatably secured within the central race socket 44. This is preferably accomplished by inserting the central engagement bushing 34 through an assembly opening 46 formed in the rear surface 48 of the first race element 38. An upper flange 50 formed on the circular wall 42 and flanged inwardly traps the central engagement bushing 34 within the central race socket 44 once the fixed race mounting base 39 is mounted. An upper extension notch 51 may be formed on the engagement extension 28 to prevent interference with the upper flange 50. A lower bushing flange 52 maybe additionally formed on the central engagement bushing 34 and adapted to correspond to an outward chamfer 54 formed at the assembly opening 46 to provide a dual rotational guide.

In order for the engagement extension 28 to be insertable and removable from the engagement chamber 32 when the central engagement bushing 34 is positioned within the central race socket 44, the circular wall 42 preferably includes an entry gap 56 through which the engagement extension 28 may pass. An outwardly flanged entrance guide 58 may be formed as an extension of the circular wall 42 to provide a guide for inserting the engagement extension 28 into the central race socket 44 and there into the engagement chamber 32. As the engagement chamber 32 does not pass entirely through the central engagement bushing 34, the engagement extension 28 is only insertable or removable from a single orientation when the engagement chamber 32 is aligned with the entry gap 56 (referred to as the installation position 60—see FIG. 4). The central engagement bushing 34 is preferably biased into the installation position 60 to facilitate easy assembly. This may be accomplished through a variety of known methods such as weights, springs, or similar biasing methodologies.

Figure 4:
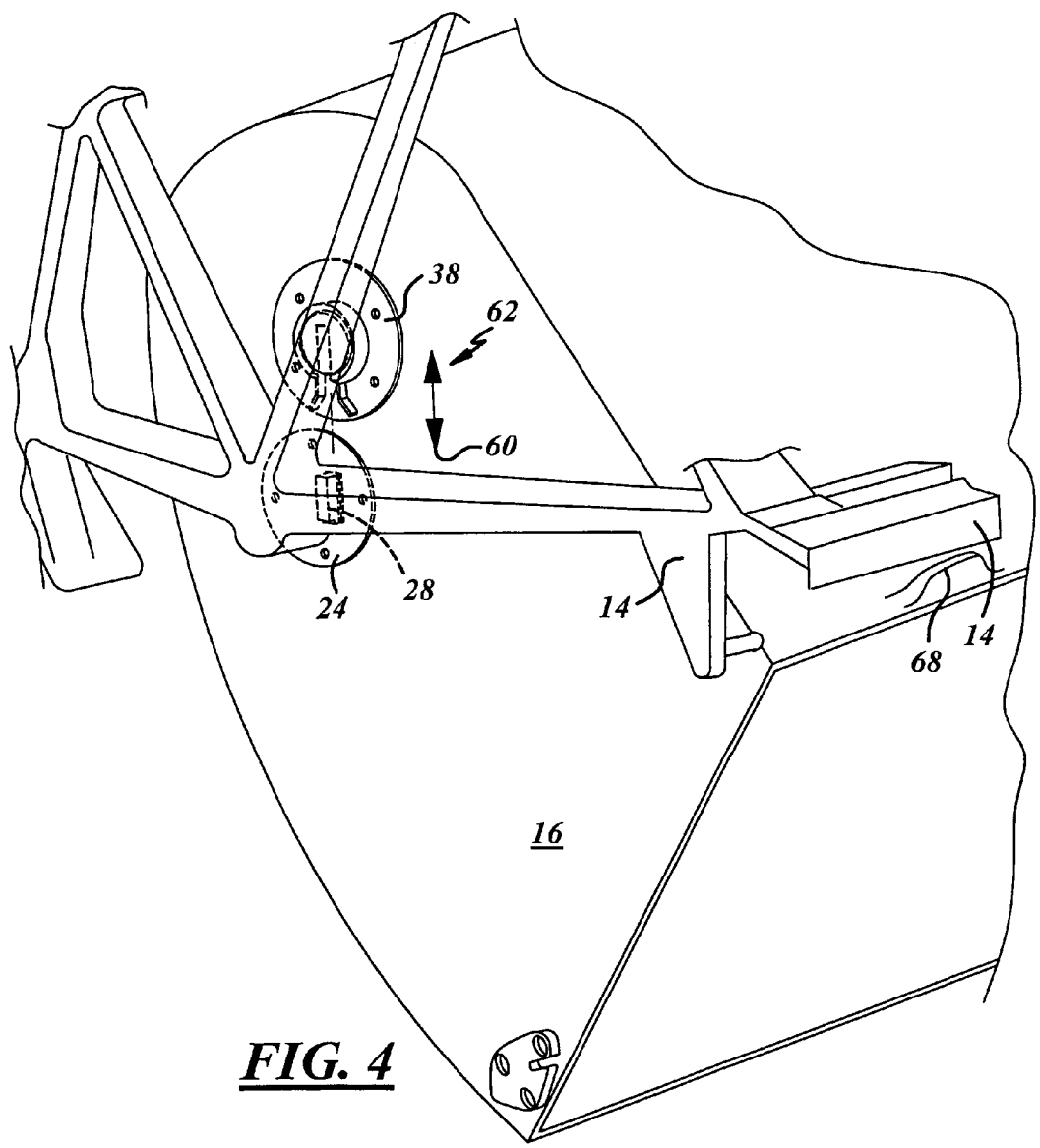
FIG. 4 is an illustration aircraft bin assembly illustrated in FIG. 3, the bin assembly illustrated in the pre-install position.

After mounting of the first pivot boss 24 to the aircraft interior overhead structure 14 and the fixed race element 38 to the overhead bin element 16, the overhead bin element 16 is raised into a pre-install position 62 positioned directly above the engagement extension 28 (see FIG. 4). It is lowered along arrow 62 into the installation position (FIG. 3) wherein the engagement extension 28 is guided into the engagement chamber 32. The overhead bin element 16 can then be rotated into a range of operating positions 66 (see FIG. 2). As the engagement extension 28 can only be removed in the installation position 60, the pivot assembly 22 becomes rotationally secured as an assembly throughout the range of operating positions 66. The overhead bin element 16 can be raised, therefore, into the bin open position 20 and prevented from unintentional movement back into the installation position 60 by way of at least one stop element 68 formed on the overhead bin element 16 and engaging the aircraft interior overhead structure 14. Although a particular stop element 68 has been described, a wide variety of stop elements 68 and relative positioning thereof would be obvious in light of the present disclosure. Similarly, a variety of latch assemblies 70 may be used to secure the overhead bin element 16 into the bin closed position 18.

The present disclosure, thereby, provides a unique pivot assembly 22 that allows assembly of the aircraft bin assembly 12 without the need for tooling or complex procedures. Similarly, the overhead bin elements 16 may be removed simply by forcing the stop elements 68 past the bin open position 20. The present invention therefore simplifies and improves bin assembly design and assembly.

While the present disclosure has been described in connection with one or more embodiments, it is to be understood that the specific mechanisms and techniques which have been described are merely illustrative of the principles of the disclosure, numerous modifications may be made to the methods and apparatus described without departing from the spirit and scope of the disclosure as defined by the appended claims.

What is claimed is:

1. A pivot assembly comprising:
    a first pivot boss including an engagement extension;
    a first race element including a central race socket; and
    a central engagement bushing rotatably secured within said central race socket said central engagement bushing including an engagement chamber adapted to removably engage said engagement extension through said first race element, said central engagement bushing allowing said first race element to rotate relative to said first pivot boss while remaining longitudinally engaged to said first fixed pivot boss.

2. A pivot assembly as described in claim 1, wherein said central race socket is formed by:
    a circular wall extruding from a mounting base of said first race element toward the first pivot boss, the circular wall substantially surrounding an assembly opening formed in said first race element through which said central engagement bushing is inserted; and
    an entry gap formed in said circular wall allowing said engagement extension to be removably inserted into said engagement chamber.

3. A pivot assembly as described in claim 2, further comprising:
    an outwardly flanged entrance guide in communication with said circular wall, said outwardly flanged entrance guide serving to guide said engagement extension into said engagement chamber.

4. A pivot assembly as described in claim 2, wherein said circular wall includes an upper flange retaining said central engagement bushing within said central race socket; and said engagement extension includes an upper extension notch positioned to engage said upper flange.

5. A pivot assembly as described in claim 1, wherein said engagement extension comprises a t-shaped beam extension; and said engagement chamber comprises a t-shaped cross-section gap.

6. A pivot assembly as described in claim 1, wherein said central engagement bushing is rotatable between an installation position and a range of operating positions, said engagement extension trapped within said engagement chamber when said central engagement bushing is in said range of operating positions.

7. A pivot assembly as described in claim 6, wherein said engagement extension may only enter said central race socket when said central engagement bushing is in said installation position.

8. A pivot assembly as described in claim 1, wherein said first race element comprises:
    a circular wall extruding from a fixed race mounting base;
    an assembly opening formed on a rear surface of said fixed race mounting base opposite said circular wall, said assembly opening adapted to allow said central engagement bushing to be passed through into said central race socket; and
    an upper flange formed on said circular wall, said upper flange restrainably engaging said central engagement bushing,
    wherein said upper flange and said engagement extension serve to retain said central engagement bushing within said central race socket.

9. An aircraft bin assembly comprising:
an airplane interior overhead structure;
an overhead bin element removably mounted to said airplane interior overhead structure, said overhead bin element rotatable between a bin closed position and a bin open position;
a pivot assembly mounted in communication with both said airplane interior overhead structure and said overhead bin element such that said overhead bin element can be rotated relative to said airplane interior overhead structure between said bin closed position and said bin open position, said pivot assembly comprising:
a first pivot boss including an engagement extension;
a first race element including a central race socket; and
a central engagement bushing rotatably secured within said central race socket, said central engagement bushing including an engagement chamber adapted to removably engage said engagement extension through said first race element, said central engagement bushing allowing said first race element to rotate relative to said first pivot boss while remaining longitudinally engaged to said first fixed pivot boss.

10. An aircraft bin assembly as described in claim 9, wherein said overhead bin element is further movable to an installation position, said engagement extension only insertable or removable from said engagement chamber when said overhead bin element is in said installation position.

11. An aircraft bin assembly as described in claim 10, wherein said overhead bin element further includes at least one stop element preventing said overhead bin element from rotating from said bin open position into said installation position.

12. An aircraft bin assembly as described in claim 11, wherein said at least one stop element is formed on an upper bin surface and provides frictional interference with said airplane interior overhead structure.

13. An aircraft bin assembly as described in claim 11, wherein said central race socket is formed by:
a circular wall extruding from a mounting base of said first race element toward the first pivot boss, the circular wall substantially surrounding an assembly opening formed in said first race element through which said central engagement bushing is inserted; and
an entry gap formed in said circular wall allowing said engagement extension to be removably inserted into said engagement chamber.

14. An aircraft bin assembly as described in claim 13, further comprising:
an outwardly flanged entrance guide in communication with said circular wall, said outwardly flanged entrance guide serving to guide said engagement extension into said engagement chamber.

15. An aircraft bin assembly as described in claim 9, wherein said first race element comprises:
a circular wall extruding from a fixed race mounting base;
an assembly opening formed on a rear surface of said fixed race mounting base opposite said circular wall, said assembly opening adapted to allow said central engagement bushing to be passed through into said central race socket; and
an upper flange formed on said circular wall, said upper flange restrainably engaging said central engagement bushing;
wherein said upper flange and said engagement extension serve to retain said central engagement bushing within said central race socket.

16. An aircraft bin assembly as described in claim 10, wherein said central engagement bushing is biased towards said installation position.

17. A method of assembling an aircraft bin assembly comprising;
mounting a first pivot boss to an airplane interior overhead structure, said first pivot boss including a fixed boss mounting base and an engagement extension extending outwards from said fixed boss mounting base;
placing a central engagement bushing within a central race socket of a first race element, said central engagement bushing rotatable within said central race socket;
mounting said first race element to an overhead bin element,
placing said overhead bin element into a bin preinstall position;
moving said overhead bin element such that said engagement extension moves into an engagement chamber formed in said central engagement bushing, said engagement chamber open to said engagement extension only in an installation position;
rotating said overhead bin element into a range of operating positions such that said engagement extension is rotatably moved out of said installation position and secured within said engagement chamber, said first pivot boss thereby rotatable relative to said first race element such that said overhead bin element is rotatable between a bin open position and a bin closed position.

18. A method of assembling an aircraft bin assembly as described in claim 17, further comprising;
placing said central engagement bushing within said central race socket by way of passing said central engagement bushing through an assembly opening formed on the rear surface of a fixed race mounting base opposite a circular wall forming said central race socket;
sealing said assembly opening by way of mounting said fixed race mounting base to said overhead bin element; and
retaining said central engagement bushing within said central race socket by way of an upper flange formed on said circular wall.

19. A method of assembling an aircraft bin assembly as described in claim 18, further comprising:
passing said engagement extension through an entry gap formed in said circular wall such that said engagement extension may enter said engagement chamber.

20. A method of assembling an aircraft bin assembly as described in claim 18, further comprising:
passing said engagement extension through an outwardly flanged entrance guide in communication with said circular wall in order to guide said engagement extension into said engagement chamber.

21. A method of assembling an aircraft bin assembly as described in claim 17, wherein said central engagement bushing is biased into said installation position.

22. A method of assembling an aircraft bin assembly as described in claim 17, further comprising:
restraining said overhead bin assembly from entering said installation position through the use of at least one stop element holding said overhead in assembly in said bin open position.

* * * * *